Nov. 2, 1965   B. R. ANKERSEN   3,215,421
ROTARY BARREL SALT BATH METAL
MELTING AND TESTING FURNACES
Filed Dec. 26, 1961   2 Sheets-Sheet 1
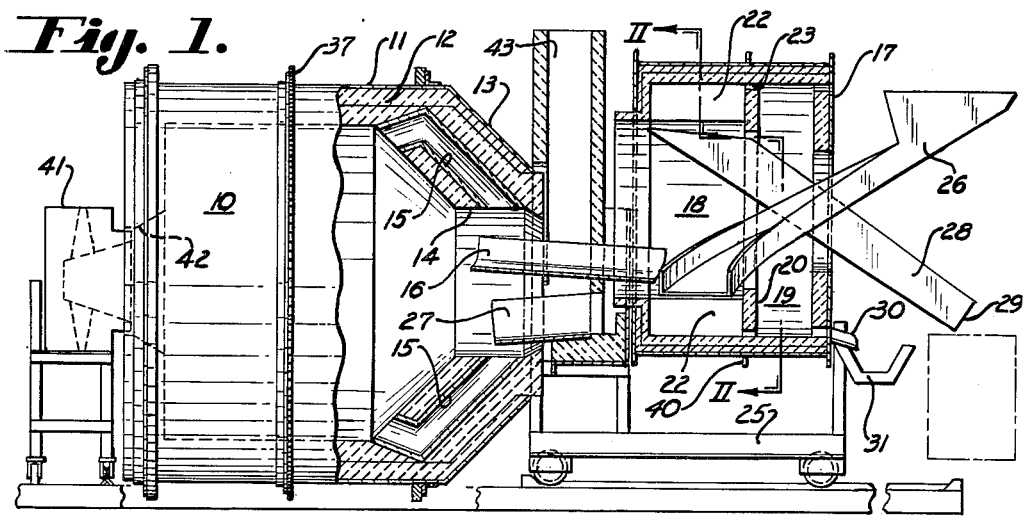
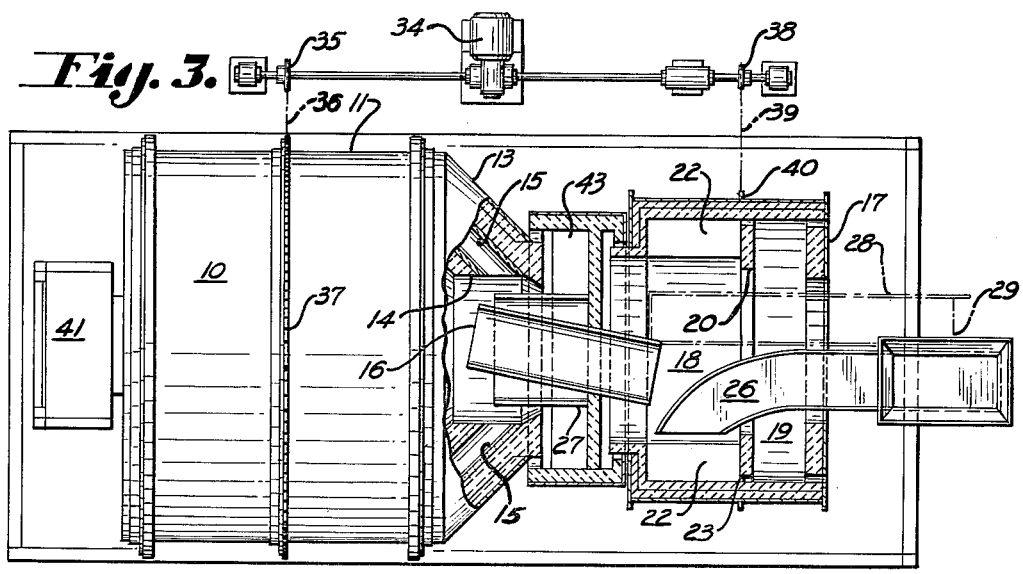
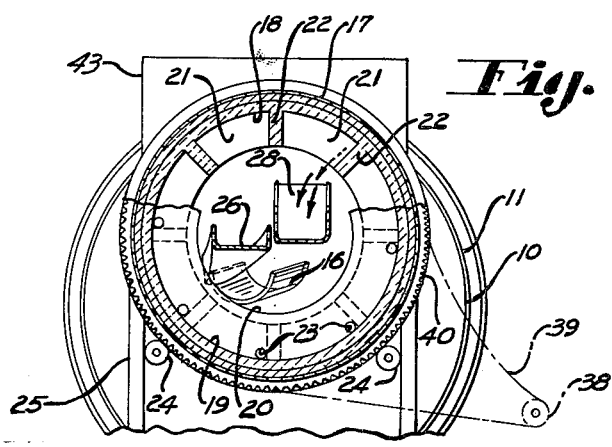
INVENTOR.
BORGE RICHARD ANKERSEN
BY
his attorneys

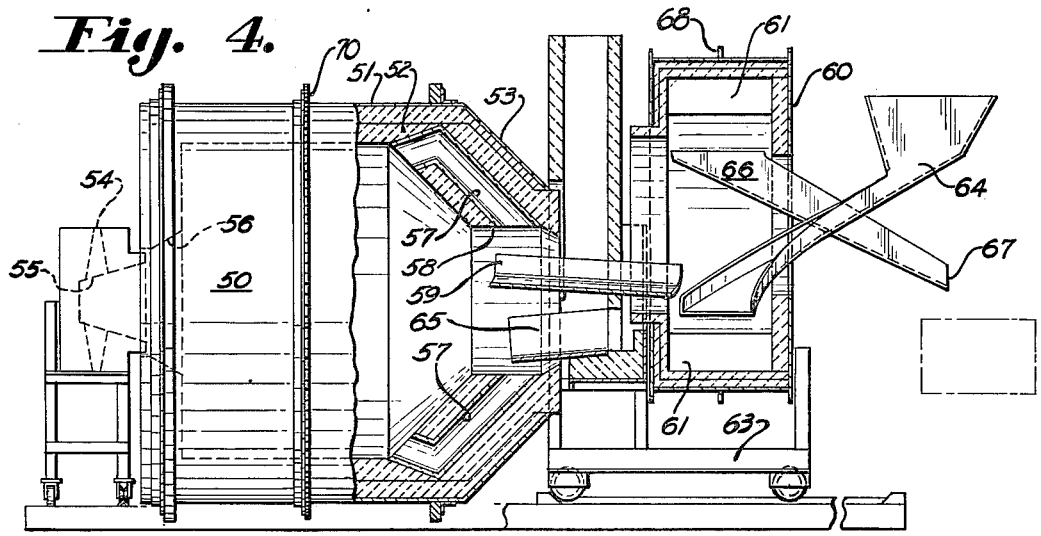
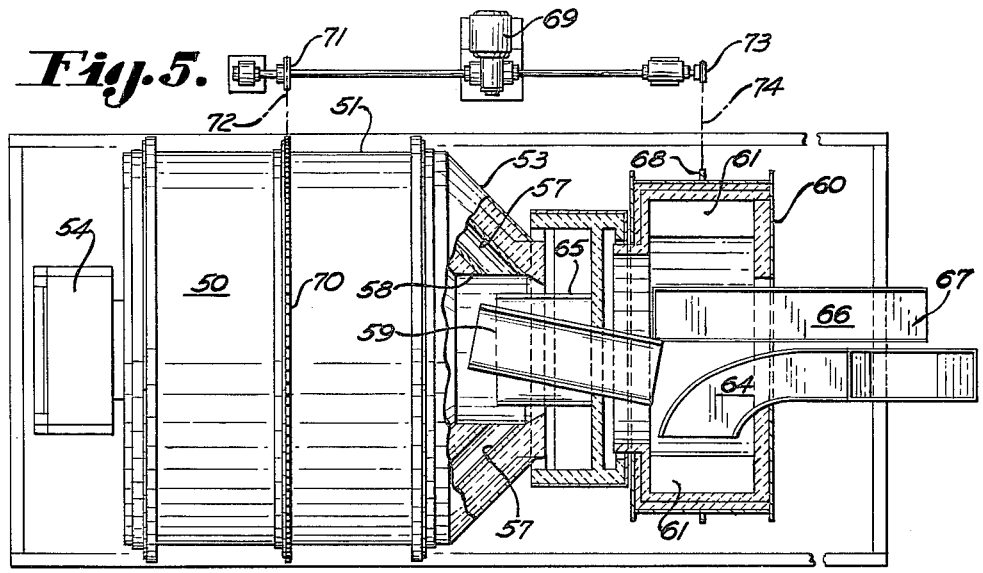

United States Patent Office 3,215,421
Patented Nov. 2, 1965

3,215,421
ROTARY BARREL SALT BATH METAL MELTING AND TESTING FURNACES
Borge Richard Ankersen, Birmingham, Mich.
(2420 Private Drive, Lake Angelus, Mich.)
Filed Dec. 26, 1961, Ser. No. 161,998
5 Claims. (Cl. 266—33)

This invention relates to rotary barrel salt bath metal melting and treating furnaces and pumps and particularly to a rotary barrel type salt furnace for melting or heating oxidizable alloys and materials.

There are many industrial situations where it is desirable to melt readily oxidizable materials such as aluminum, particularly aluminum containing supporting members of other metal or to heat treat metal members without the oxidation losses normally encountered. For example, it is frequently desired to melt aluminum chips, filings, turnings and the like scrap. Conventional melting methods are either too slow, too costly or the losses in aluminum through oxidation are too high to be economically feasible. It is also frequently necessary to melt aluminum, zinc or other light relatively low melting metal scrap containing supporting elements, or wearing elements or the like without melting such other metal elements and contaminating the molten metal. For example, aluminum pistons have steel supporting rods in the body of the piston for reinforcement, zinc die cast journals have bronze bearings cast into them. In every such case, it is important to melt away the low melting metal and remove the higher melting metal before it is attacked. Various attempts to solve such problems have been made but without any real success.

I have invented a furnace structure which will overcome these problems. By the use of my furnace, it is possible to continuously melt aluminum or like chips and similar fine scrap without excessive losses and without the expensive techniques heretofore proposed or to melt aluminum, zinc or similar lower melting metals away from higher melting metals.

I provide a cylindrical furnace portion, a fluid heat transfer medium in said furnace, diagonal chordal conduit means extending from a point adjacent the inner wall of the furnace to a point adjacent the axis of the furnace at one end, an opening in said one end, a trough extending into the opening to receive a stream of fluid from said fluid conduits for delivery out of the furnace, burner means directing a flame into said cylindrical portion, drive means rotating said body portion, drum means surrounding the outlet end of the trough and receiving the stream of fluid therefrom, transverse flights in said drum extending axially inwardly from the inner wall, feeder means delivering metal to be melted into the area between the flights, delivery means receiving unmelted metal from the flights after they pass through the stream of fluid and fluid return means returning the fluid from the drum to the furnace.

In the foregoing general description, I have set out certain objects, advantages and purposes of my invention. Other objects, advantages and purposes of my invention will be apparent from a consideration of the following description and the accompanying drawings in which:

FIGURE 1 is a side elevational view of a furnace partly in longitudinal vertical section according to my invention;

FIGURE 2 is a transverse sectional view taken on line II—II of FIGURE 1;

FIGURE 3 is a top plan view partly in section of the embodiment of furnace shown in FIGURE 1;

FIGURE 4 is a side elevational view of a furnace partly in longitudinal vertical section through a second embodiment of a furnace according to my invention; and FIGURE 5 is a top plan view partly in section of the embodiment in FIGURE 4.

Referring to the drawings, and particularly to FIGURES 1, 2 and 3, I have illustrated a cylindrical furnace body 10 having an outer metal shell 11 and a refractory lining 12. A frusto-conical end portion 13 is provided at one end of the cylindrical furnace body 10 having an opening 14 therein. Spaced elongated passages 15 extend diagonally from the base of frusto-conical end 13 to opening 14 of the frusto-conical end portion. These passages act to deliver fluid from the base of the frusto-conical end 13 to the opening 14. A trough 16 extends into opening 14 and receives the discharge from passages 15. Trough 16 connects with a rotary well 17.

The well 17 is divided into two cylindrical portions 18 and 19 by a wall 20. One of these portions 18 receives the heating fluid from trough 16 and is divided into segments 21 by radial flights 22. Each segment is connected to portion 19 of the well by a passage 23 passing through wall 20 adjacent the rearward face of the flight. The well 17 is rotatable on guide rolls 24 in a frame 25 at the output end of the furnace. A charging chute 26 is provided extending into the well 17 to a point in portion 18 to feed aluminum chips into the fluid flowing in the trough. A return trough 27 lies beneath trough 16 and connects well 17 with the interior of the furnace. The furnace is provided with a molten bath of salt, whose specific gravity is less than that of the metal being melted so that a clean gravity separation is established. A discharge chute 28 extends from the interior of portion 18 to a discharge point 29 outside the well. A discharge spout 30 is provided in portion 19 delivering molten metal cyclically to a metal runner 31 leading to a casting or pigging machine not shown.

In operation, aluminum or like chips to be melted are fed from chute 26 into segments 21. The furnace body is rotated on carrier rolls in conventional manner by a drive motor 34 acting through pinion 35, chain 36 and a rack 37 surrounding the outer shell of the furnace. The chips entering well 17 are immediately submerged by molten salt flowing from the trough 16. The molten salt carries the chips beneath the surface of the salt and the molten aluminum flows through passages 23 into well portion 19 so that the chips are covered before any opportunity for oxidation has occurred. The excess salt with unmelted chips is carried into the interior of furnace 10 through trough 27 where melting is completed. Rotation of the furnace causes the molten metal as well as salt to be lifted through the passages 15, which deliver it to trough 16 along with an amount of salt which acts as a protective layer throughout the processing steps. The molten metal passes into well 17 along with new chips from chute 26 and the cycle is repeated.

The aluminum in well portion 19 is discharged through spout 30 each time the well 17 makes a rotation. Well 17 is rotated by drive motor 34 acting through pinion 38, chain 39 and rack 40.

The salt which is recirculated to the furnace is retained and used continuously as the heat transfer and protective media for the metal.

The furnace is fired by a burner 41 firing through opening 42 in the end of the furnace opposite trough 16. Preferably, the burner is directed downwardly onto the salt. Flue gases are discharged through stack 43 above trough 16.

When aluminum or like scrap containing supporting elements of another metal such as iron, commonly called "breakage," are melted, the scrap is fed through chute 26 precisely as in the case of chips. In the case of "breakage," however, the supporting elements of another metal do not melt and are carried by flights 22 until the angle of repose is passed, whereupon the other metal parts slide off the flights 22 into discharge chute 28 and are carried to discharge point 29. The molten aluminum is discharged as described above.

In the from shown in FIGURES 4 and 5, I have illustrated a heat treating furnace 50 having an outer steel shell 51 and a refractory lining 52. A frusto-conical end portion 53 is provided at one end of the body of furnace 50. The furnace is heated by radial burners 54 firing into axial burner block opening 55 which passes through an opening 56 in the end of the furnace opposite the frusto-conical end. Spaced passages 57 extend diagonally from the periphery of furnace 50 to opening 58 in the frusto-conical end 53 so as to discharge into trough 59 extending into a rotary well 60. The well is rotatable on guide rolls similar to rolls 24 of FIGURE 3 in frame 63 at the output end of the furnace. Well 60 is identical with portion 18 of well 17 and is provided with like flights 61.

A charging chute 64 is provided extending from a point outside well 60 to a point above flights 61. Articles to be heat treated, e.g., crankarms, crankpins, crankshafts, etc., are fed into chute 64 and from thence into the segment formed between flights 61 where salt from trough 59 pours over the article to raise its temperature. The used salt is returned to furnace 50 by a return chute 65. The heated articles are carried by flights 61 as well 60 rotates to a point beyond their angle of repose where they fall onto discharge chute 66 which carries them to a discharge point 67 outside the furnace.

The furnace is rotated on rollers in conventional manner as in FIGURES 1–3 by motor 69 driving rack 70 through pinion 71 and chain 72. The well 60 is driven by the same motor through rack 68, pinion 73 and chain 74.

The operation of this embodiment is essentially the same as that of FIGURES 1 through 3 with certain obvious modifications.

It will be obvious from the foregoing description that the structure of this invention is particularly advantageous for salt bath heat treatment or melting of "breakage" where a discharge of solid elements will be expected.

It is also obvious that other methods of heating the salt in the furnace might be used. For example, electrical heating electrodes might be inserted into the furnace interior through the opening 42 into the salt.

In the foregoing specification, I have illustrated and described certain preferred embodiments of my invention. However, it will be understood that the invention may be otherwise embodied within the scope of the following claims.

I claim:
1. A metal melting and treating furnace for melting and treating oxidizable metals and the like comprising a cylindrical housing, a fluid heat transfer medium in said cylindrical portion, a frusto-conical end portion on one end of said housing, spaced chordal enclosed passages beginning adjacent the inner periphery of the housing and extending toward the frusto-conical apex and adapted to deliver fluid heat transfer medium to the said apex, a trough extending into the apex of said frusto conical end to receive fluid from said passages and extending out of said conical end to discharge outside said end, burner means directing a flame through said cylindrical housing, rotary well means adjacent and spaced from the apex receiving fluid from said trough, lift means in said well dividing said well into segments receiving the metal for treatment, drive means separately rotating said cylindrical housing and said well, feeder means extending into the well means at the end opposite the trough delivering metal to be treated to said segments, discharge means extending into the well means at the end opposite the trough receiving solid treated metal from the segments and discharging it externally of the well, return means extending between the well and frusto-conical end delivering the fluid heat transfer medium to the interior of the housing and molten metal discharge communicating from said well to the exterior of said well delivering molten metal therefrom.

2. A metal melting furnace as claimed in claim 1 wherein the feeder means delivers metals to be melted into a segment adjacent the bottom of the path of travel of the well and beneath the discharge end of the trough to cause the fluid heat transfer medium to cascade onto said metal.

3. A metal melting furnace as claimed in claim 1 wherein the well means includes a generally cylindrical housing, roller means supporting said housing for rotation about its axis, discharge means on said housing adapted on rotation of said housing to deliver molten metal from the housing, said housing being divided internally into two cylindrical portions, one containing the lift means and receiving fluid from the trough, the other communicating with said one portion and the discharge means.

4. A metal melting furnace as claimed in claim 1 wherein the discharge means is a chute which extends through an opening in the end of the cylindrical well opposite the apex of the frusto-conical end of the furnace from a point adjacent the top of the path of travel of the lift means to a lower point outside the well.

5. A metal melting furnace as claimed in claim 1 wherein the lift means are radially inwardly extending flights.

References Cited by the Examiner
UNITED STATES PATENTS
2,987,391   6/61   Foster et al. _____ 266—33

MORRIS O. WOLK, *Primary Examiner.*

WINSTON A. DOUGLAS, *Examiner.*